April 21, 1931.  J. SINCLAIR  1,801,758
IRRIGATING TILE
Filed Nov. 28, 1927   2 Sheets-Sheet 1
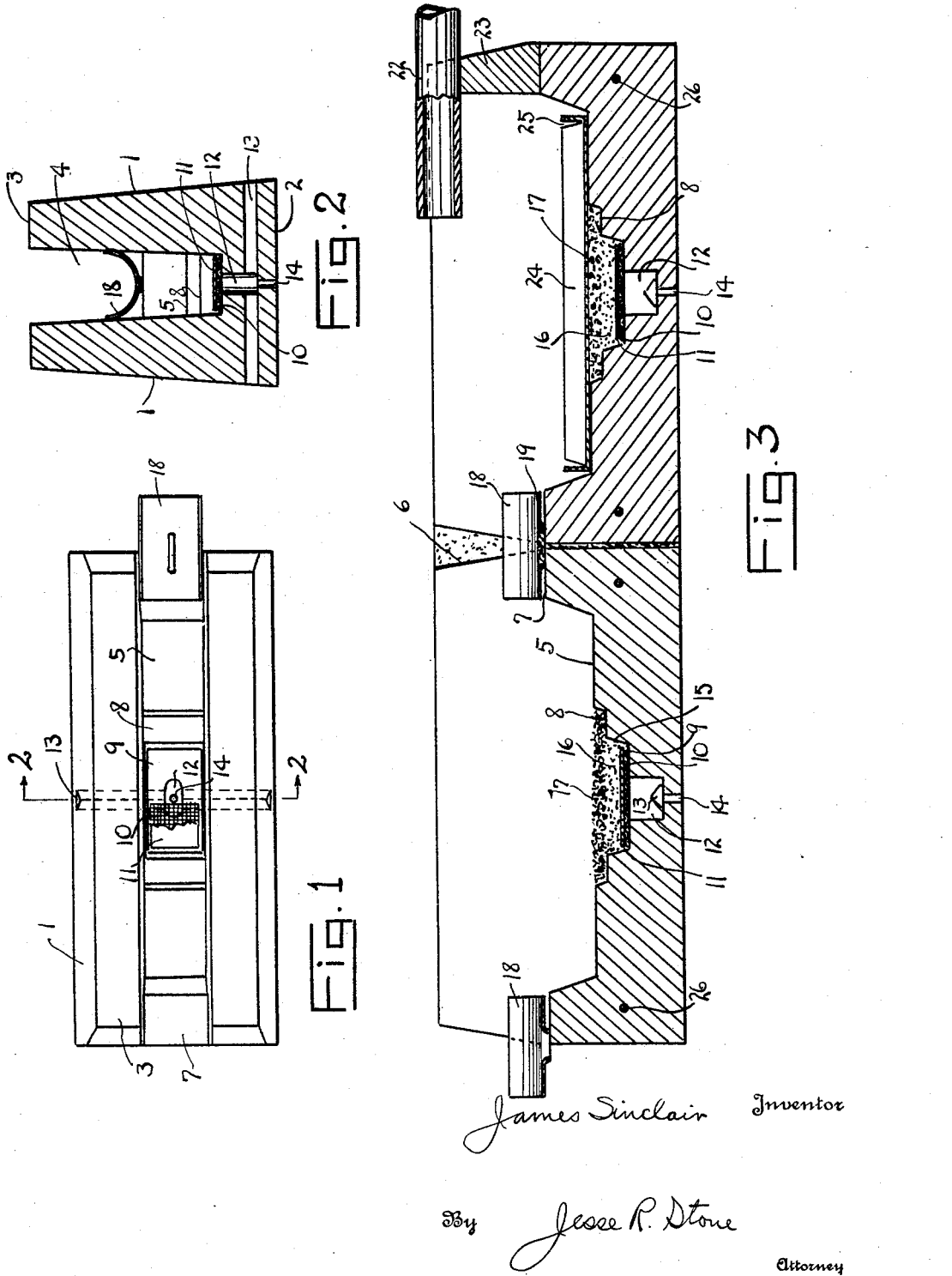
James Sinclair Inventor
By Jesse R. Stone Attorney April 21, 1931.  J. SINCLAIR  1,801,758
IRRIGATING TILE
Filed Nov. 28, 1927  2 Sheets-Sheet 2

James Sinclair Inventor
By Jesse R. Stone
Attorney

Patented Apr. 21, 1931

1,801,758

UNITED STATES PATENT OFFICE

JAMES SINCLAIR, OF HOUSTON, TEXAS

IRRIGATING TILE

Application filed November 28, 1927. Serial No. 236,071.

My invention relates to a tile for irrigating and is particularly adapted for use in the irrigation of gardens and the like, although it is adapted for general field and orchard irrigation.

In the ordinary method of irrigating, it is common to form ditches in the earth along the field to irrigate it and to flow water through these ditches so as to distribute the water over the field. This method is wasteful of water and does not secure an even distribution of the moisture through the soil. The soil is either too wet or too dry part of the time, and a much larger consumption of water results than is necessary for the proper growing of the crop. Other methods of irrigating by use of perforated pipes have been tried, but without any great success.

It is an object of my invention to provide a tile which will serve to distribute the water used for irrigation evenly through the soil and maintain the soil with the proper amount of moisture therein. The purpose of the invention is mainly to distribute the right amount of moisture to properly develop the crop so as to produce a uniform and even distribution of the moisture without danger of washing the roots of the plants and without forming an excess of moisture in the soil.

It is an object to economize in the amount of water necessary for irrigation and to provide means whereby the excess water from precipitation may run off, thus avoiding the standing of water around the plants and still maintaining sufficient moisture to properly irrigate the crop.

Figure 4:
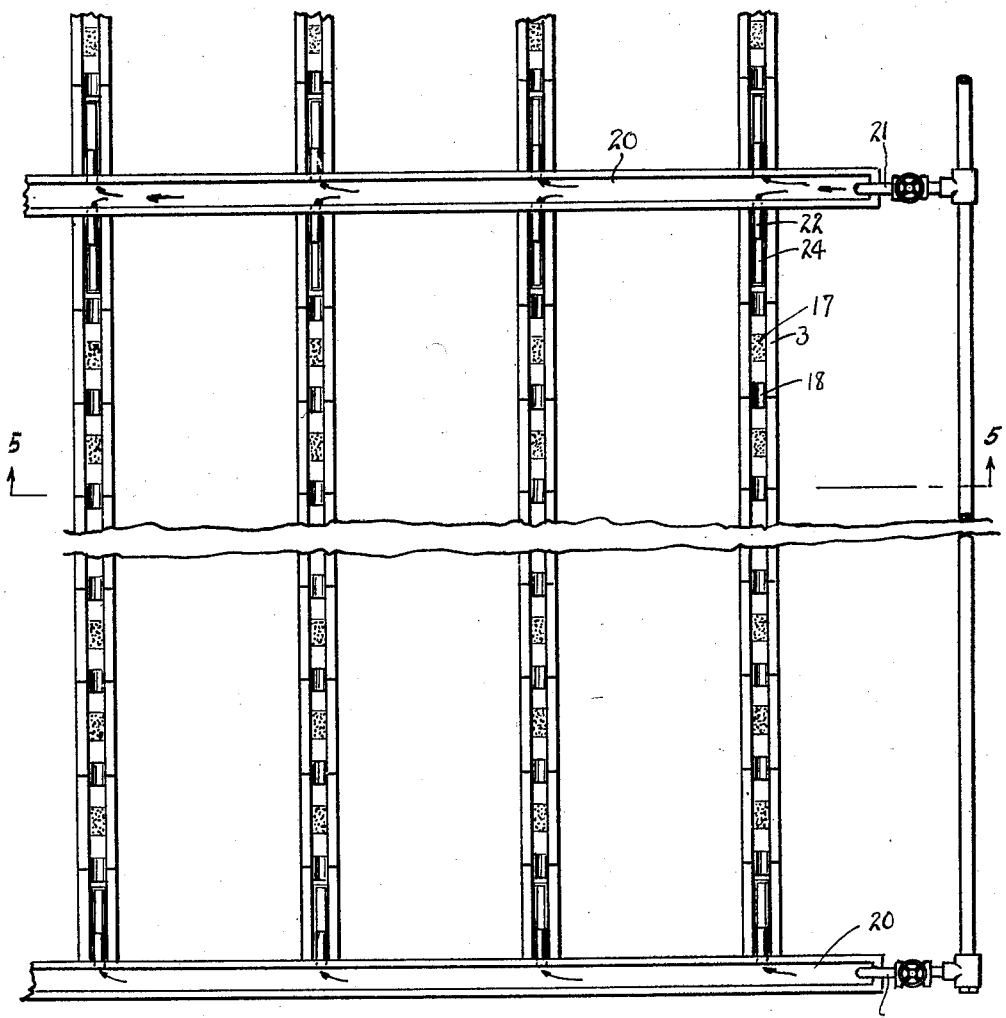
Figure 5:
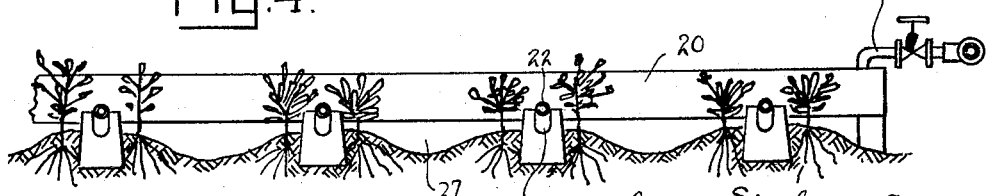

The invention lies largely in the construction and arrangement of the tile whereby these objects may be carried out, and reference is made to the accompanying drawing wherein the construction of my invention is disclosed. Fig. 1 illustrates a top plan view of one of the tile, certain parts being broken away for greater clearness. Fig. 2 is a transverse section on the plane 2—2 of Fig. 1. Fig. 3 is a longitudinal section through two of my units placed end to end and illustrating the manner in which they are employed. Fig. 4 is a plan view illustrating the use of the tile in a field or garden. Fig. 5 is a sectional view approximately on the plane 5—5 of Fig. 4, showing the manner in which the tile are placed in the soil.

In order to distribute the irrigating water effectively relative to the plants, I find it most advantageous to deliver the water to the soil at points spaced below the top of the ground. By distributing water below the top of the soil, it is not so subject to evaporation and is delivered more nearly to the roots of the plants where it may be used by the plants. Furthermore, the surface of the soil is not soaked with water and will not bake and get hard under the action of the sun. I, therefore, have devised a means for delivering the water below the level of the soil. I prepare the ground to receive the distributing tile by banking the earth up in rows across the field or garden, thus providing draining ditches or channels between the rows. I then sink within the crest of each row and longitudinally thereof a series of tile placed end to end from which the water may be distributed to the row; and the plants are grown along the top of the row on each side of the row of tile.

The tile which I employ when arranged in the garden or field is in fact a trough or channel made of some material such as cement, which is practically impervious to water. These tile are cast so as to be placed end to end, as shown particularly in Fig. 3. The blocks of which the tile is made are oblong and rectangular in general outline when viewed from above. They are of slightly greater width at the lower sides than they are at the upper sides, thus providing outer upwardly tapered sides 1 leading from the bottom 2 upwardly to the upper side 3. A channel indicated at 4 is formed longitudinally of the block and extending from the upper side downwardly to the lower side of the trough 5. Each block has the upper portion of the end thereof beveled inwardly at 6 to provide a V-shaped notch between the ends of adjacent tile when they are set together. This notch is to receive cement by means of which the tile may be secured together.

The ends of the trough 4 are extended downwardly to a shoulder or wall 7, which forms a sort of partition between adjacent tile so that there is a separate basin formed between the partitions 7 at each end which serves to hold the water, as will be further explained.

The bottom wall 5 of each tile is recessed intermediate the ends of the tile to form a settling chamber. This chamber is arranged in three stages. The upper stage 18 is of shallow depth and has its ends spaced somewhat from the end of the trough. Inwardly from this stage the bottom is further recessed to form a lower shoulder 9. This shoulder is of material width and serves as a support for a filtering plate 10 and a stop plate 11. Below this shoulder 9 the tile is still further recessed at 12, providing a chamber of narrow width and greater depth than the rest of the recess. This chamber 12 is open and has drainage passages 13 at the sides thereof and drainage passages 14 extending downwardly therefrom.

The filtering plate 10 is of some foraminous material such as wire screen plate and fits within the rectangular recess in which it is placed, and serves to prevent the sand and soil above it from passing outwardly with the water. Above the filtering plate is the stop plate 11 which is of sheet metal and of slightly smaller size than the bottom of the recess in which it fits. It serves as a support for a filtering medium above it. There is, however, a narrow passage indicated at 15 around the edges of the plate through which the water may pass.

Above the plates 10 and 11 I place a layer of sand of fairly fine but uniform granules, indicated at 16, and I prefer to use ordinary river sand for this purpose, although any other sand of this character may be substituted. Above the layer of sand is a second layer 17, which is preferably of a silty, non-porous soil, such as is usually found in the rice farming country. This layer of soil and sand fills in the recess in the bottom of the tile level with the bottom 5.

Between adjacent tile when thus placed end to end and upon the partition 7, I place a short sheet metal plate 18. This plate is curved transversely and fits within the channel at the end of the tile and is of sufficient width to reach from one basin to the next. I form an opening 19 in the bottom of the plate midway between the ends into which cement may be moulded when the tile are cemented together, thus holding the plate in position. This plate serves to carry the water from one tile to the adjacent one, taking up any wear due to erosion and allowing the free flow of water from one tile to the next adjacent one.

The openings extending from the recess 12 in the bottom of the tile comprise two lateral openings 13, as previously stated, extending horizontally outward, and these channels are preferably triangular in shape with the apex presented upwardly. The water from the tile issues through the lateral openings at a point below the level of the soil. The triangular shape of the opening is such as to prevent the accumulation of earth therein from the outside. The central downward passage 14 delivers water at a point directly beneath the tile.

The tile are arranged in rows across the plat of ground in which they are placed, as indicated in Fig. 4. The length of each row from the point where the water is delivered to the tile may be arranged as is most convenient in the particular installation considered. At the end of each row of tile, I provide means for delivering water thereto, and in Fig. 4 I have shown a transverse trough 20, in the end of which a water pipe 21 is adapted to discharge. In the sides of this trough 20 over each line of tile is a discharge spout 22, from which the water may pass to the end tile. In Fig. 3 the end tile is shown as having the outer end closed by means of a wall 23 of cement or concrete and the delivery pipe 22 is fitted within a notch in the upper end of this wall.

In order to prevent the water discharging from the pipe 22 from washing away the silt and the sand within the bottom recess of the tile, I place a shallow pan 24 within the bottom of the trough, resting upon the surface 5. This pan is of ordinary sheet metal and the corners have slots 25 therein to allow the water to flow freely through the sides and over the margin thereof so as to fill the tile, but serving to protect the filtering material in the bottom of the tile. The tile may be reinforced, if desired, by rods 26 or any other suitable means.

In forming these tile, I make the central basin thereof of sufficient size to contain the amount of water necessary to irrigate the soil adjacent thereto for a period of approximately one day, so that it is contemplated that water will be run into these tile about once a day, but this is largely a matter of the condition of the weather. If it is determined that the soil needs more moisture, irrigation may take place oftener, while in periods of rain it may be unnecessary to irrigate for several days at a time. I contemplate that enough water will be contained within each tile to have the effect of a rainfall of about one-half inch.

In the operation of my improved tile, water will be run into a row of these tile so as to fill the channel in the tile to a point closely adjacent the top. In order to assure an even distribution, I contemplate flowing water into the rows alternately from the opposite ends. The water in each particular row will gradually filter out through the soil at the bottom of the tile around the filter plate in the bottom thereof and will drip out through the check openings 13 and 14 to the adjacent soil. There will be such a gradual flow or seepage of the water that it will be soaked by the adjacent soil without washing the roots in any manner. Being delivered below the level of the earth in the row it will be carried directly to the roots of the plant where it will be most effective. Furthermore, when delivered in this gradual flow below the level of the ground, it will be carried away by the capillarity of the adjacent soil and be distributed equally along the row. It will be noted that the distributing openings in the tile are spaced evenly apart along the row in such manner that the soil may be uniformly moistened along the full length of the row of tile.

In case of rains tending to wash the roots of the plants, the arrangement of the plants along the row will allow the rain to flow into the drainage ditches or paths 27 between the rows where it may run off and be carried from the field. There will be no opportunity for the washing of the roots of the plants, and the water delivered in this manner will be most effectively used and in economical quantities.

The tile in the rows may be considered a permanent construction and not to be moved unless something unforseen happens. They will remain at all times on a wall of earth that is never under cultivation and has its moisture content kept up by the flow of water from the tile.

It will be obvious that different kinds of soil will need slightly different treatment. Either greater or smaller amounts of water will be necessary. This type of tile may be easily formed to accommodate the delivery of different amounts of water. This can be done in varying the size of the tile itself, and also in the number of the delivering openings. It will be possible, therefore, to employ this tile in various soils and in various climates by obvious modifications in the structure of the tile itself without departing from the spirit of the invention.

Having thus described my invention, what I claim as new is:

1. In a water distributing system for irrigation, trough-shaped members each having a central basin therein with a central recess in said basin, filtering means in said recess, and distributing channels leading from said recess and adapted to discharge below the level of the surrounding soil laterally into the surface to be irrigated.

2. In a water distributing system for irrigation, trough-shaped members each having a central basin therein with a central recess in said basin, a foraminated plate in said recess and means above said plate to check the rapid flow of liquid from said basin to said recess, and distributing channels leading from said recess and adapted to discharge below the level of the surrounding soil and into the surface soil to be irrigated.

3. A tile unit including a trough-shaped member having a central basin therein with a central recess in said basin, a foraminated plate in said recess, a layer of filtering material above said plate, means to support said material above said plate, and distributing channels leading from said recess and adapted to discharge into the surface soil slightly below the level of the surrounding soil.

4. A tile unit including a trough-shaped member having a central basin therein with a central recess in said basin, a plate fitting loosely in said recess, a layer of sand thereon, a layer of silty soil on said sand, and distributing channels leading from said recess and adapted to discharge into the surface soil just below the level of the surrounding soil.

5. An irrigating tile of the character stated, comprising a block of impervious material having a trough along its upper side, a basin between the ends of said tile having a downwardly stepped recess centrally thereof, there being liquid discharge openings from said recess, and means in said recess to check the flow of liquid to said discharge openings, said openings being adapted to discharge into the surface soil just below the soil level.

6. In an irrigating system, a series of distributing units adapted to be placed end to end, said units having a deep channel on their upper sides, and basins in each unit, means to conduct liquid from one unit to the adjacent units, the bottom of each basin being recessed with discharge openings from the recesses, metal plates in said recesses to support a filtering material, and earthy filtering means to check the flow of liquid to said recessed portions and said openings.

7. An irrigating tile including a block of material practically impervious to water and formed to be placed end to end with other similar blocks, said block being of oblong rectangular shape and having its side and end walls converging upwardly, a longitudinal basin in each tile, the ends of said basin being stepped downwardly, means therein to retard the passage of water, discharge channels in said tile below said retarding means to direct the irrigating water laterally into the surface soil to be irrigated, and means to connect said tile with other similar tiles in a system.

8. An irrigating tile of the character described comprising a recessed block, a basin in the base of the recess, a discharge passage leading from said basin transversely of said block and a drainage passage of lesser area than said discharge passage and extending through the bottom of said block.

In testimony whereof I hereunto affix my signature this 23rd day of November, A. D. 1927.

JAMES SINCLAIR.